United States Patent
Tsuchiya et al.

(10) Patent No.: US 10,514,750 B2
(45) Date of Patent: Dec. 24, 2019

(54) INFORMATION PROCESSOR AND IMAGE GENERATION METHOD

(71) Applicant: SONY INTERACTIVE ENTERTAINMENT INC., Tokyo (JP)

(72) Inventors: Akitsugu Tsuchiya, Tokyo (JP); Shigeru Enomoto, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 228 days.

(21) Appl. No.: 15/554,001

(22) PCT Filed: Feb. 19, 2016

(86) PCT No.: PCT/JP2016/054817
§ 371 (c)(1),
(2) Date: Aug. 27, 2017

(87) PCT Pub. No.: WO2016/136605
PCT Pub. Date: Sep. 1, 2016

(65) Prior Publication Data
US 2018/0039321 A1    Feb. 8, 2018

(30) Foreign Application Priority Data
Feb. 27, 2015  (JP) .................. 2015-038526

(51) Int. Cl.
*G06F 1/26* (2006.01)
*G06F 1/3234* (2019.01)
(Continued)

(52) U.S. Cl.
CPC ............ *G06F 1/3265* (2013.01); *A63F 13/25* (2014.09); *A63F 13/35* (2014.09); *A63F 13/52* (2014.09);
(Continued)

(58) Field of Classification Search
CPC .... G06F 1/3265; G06F 1/3287; A63F 13/493; A63F 13/53; A63F 13/87; A63F 13/52;
(Continued)

(56) References Cited

U.S. PATENT DOCUMENTS

2006/0248473 A1*  11/2006  Nagumo ............ H04N 1/00413
                                                                    715/810
2009/0161023 A1*   6/2009  Koncelik, Jr. ........... H04N 5/50
                                                                     348/731
(Continued)

FOREIGN PATENT DOCUMENTS

JP     2001-005546 A     1/2001
JP     2012-130017 A     7/2012
(Continued)

OTHER PUBLICATIONS

International Search Report from Int'l App. No. PCT/JP2016/054817, dated Apr. 26, 2016.
(Continued)

*Primary Examiner* — Volvick Derose
(74) *Attorney, Agent, or Firm* — Matthew B. Dernier, Esq.

(57) ABSTRACT

A mode control section 130 selects power saving mode as an operation mode, and a screen control section 120 generates a display screen. After the mode control section 130 switches the mode from power saving mode to normal mode, the screen control section 120 generates a display screen to match the type of screen that appeared before power saving mode was selected. If an application screen appeared before power saving mode is selected, the screen control section 120 generates the application screen after the mode is switched from power saving mode to normal mode. If a system screen appeared before power saving mode is selected, the screen control section 120 generates a given
(Continued)

system screen after the mode is switched from power saving mode to normal mode.

8 Claims, 9 Drawing Sheets

(51) Int. Cl.
    *A63F 13/25*     (2014.01)
    *A63F 13/35*     (2014.01)
    *A63F 13/52*     (2014.01)
    *A63F 13/79*     (2014.01)
    *A63F 13/87*     (2014.01)
    *G06F 1/3287*     (2019.01)
    *G06F 1/3203*     (2019.01)

(52) U.S. Cl.
    CPC .............. *A63F 13/79* (2014.09); *A63F 13/87* (2014.09); *G06F 1/3287* (2013.01); *G06F 1/3203* (2013.01)

(58) Field of Classification Search
    CPC .......... A63F 13/35; A63F 13/25; A63F 13/79; A63F 13/00
    USPC .......................................................... 713/300
    See application file for complete search history.

(56) References Cited

U.S. PATENT DOCUMENTS

| | | | |
|---|---|---|---|
| 2010/0064068 A1* | 3/2010 | Miyazawa | G03G 15/5004 710/19 |
| 2013/0227324 A1* | 8/2013 | Saito | G06F 1/3203 713/323 |
| 2013/0305069 A1* | 11/2013 | Goda | G06F 1/3275 713/323 |
| 2014/0218286 A1* | 8/2014 | Kim | G09G 3/3453 345/156 |
| 2015/0169038 A1* | 6/2015 | Kim | G06F 1/3265 345/173 |

FOREIGN PATENT DOCUMENTS

| | | |
|---|---|---|
| JP | 2013-101433 A | 5/2013 |
| JP | 2013-222394 A | 10/2013 |

OTHER PUBLICATIONS

International Preliminary Report on Patentability from Int'l App. No. PCT/JP2016/054817, dated Aug. 29, 2017 as English translation of Written Opinion of the Int'l. Searching Authority dated Apr. 26, 2016.

* cited by examiner

FIG. 4
(a)
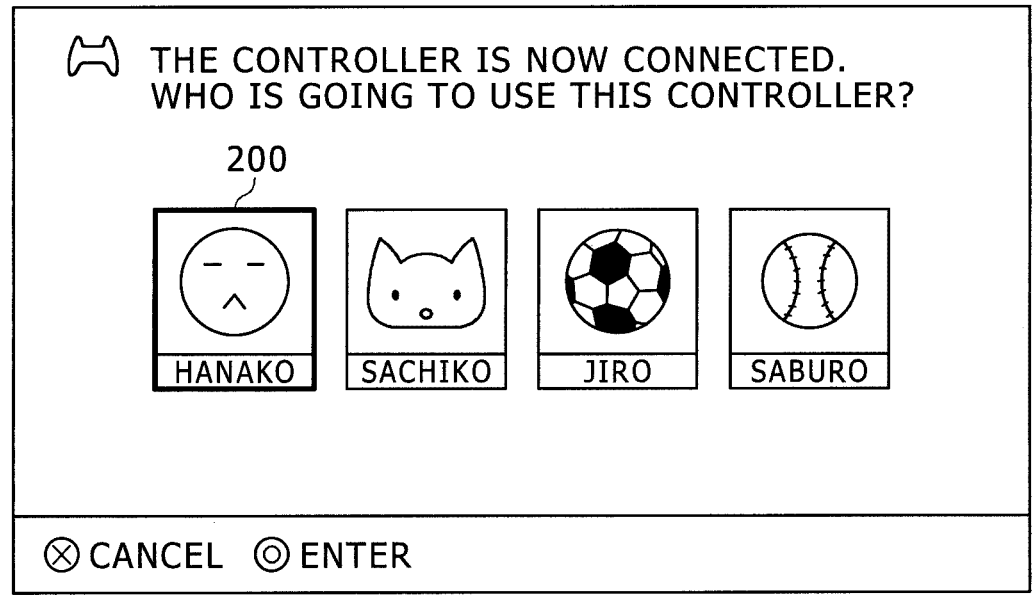
4
(b)
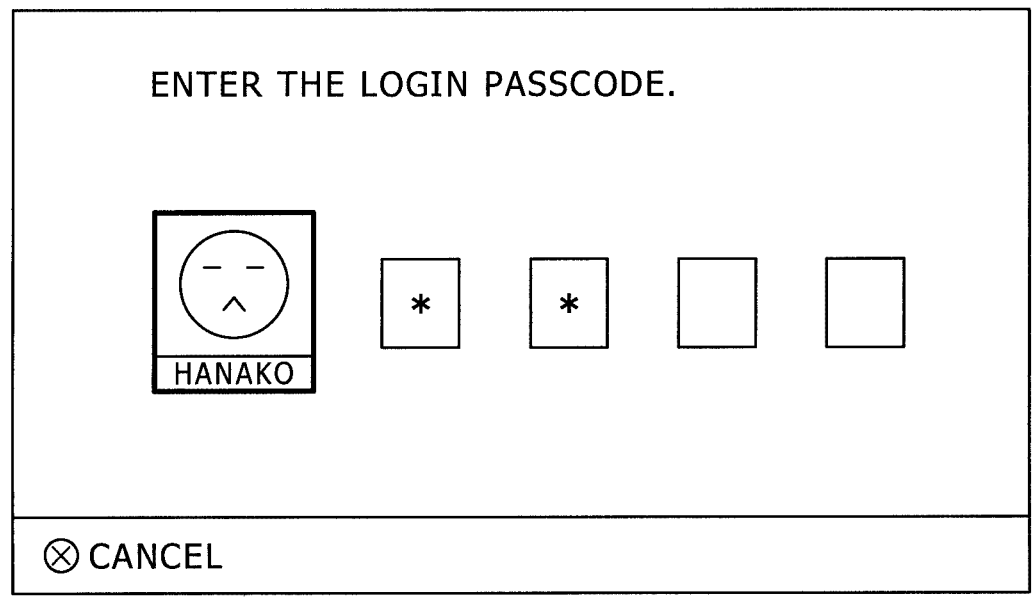
4

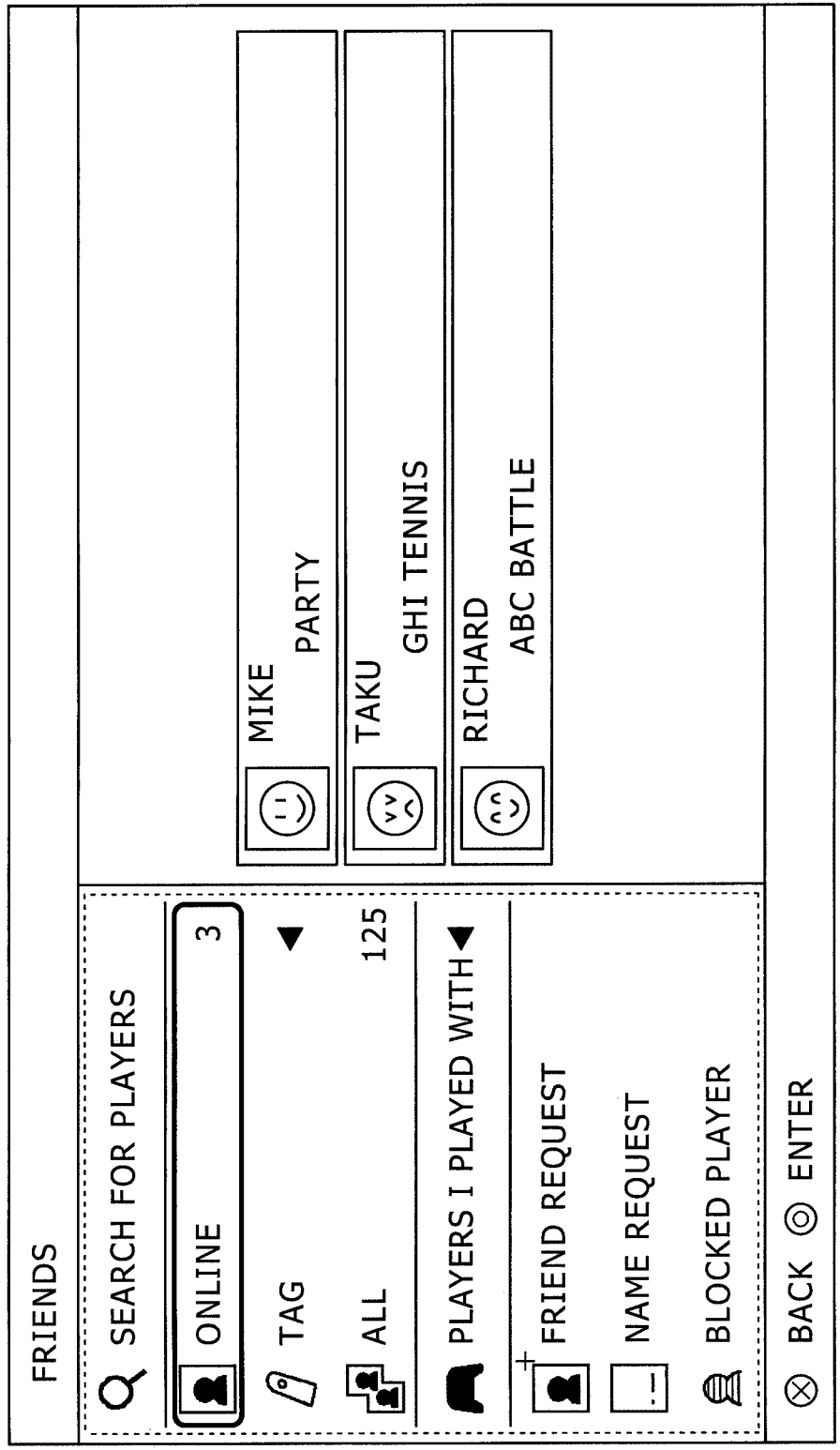

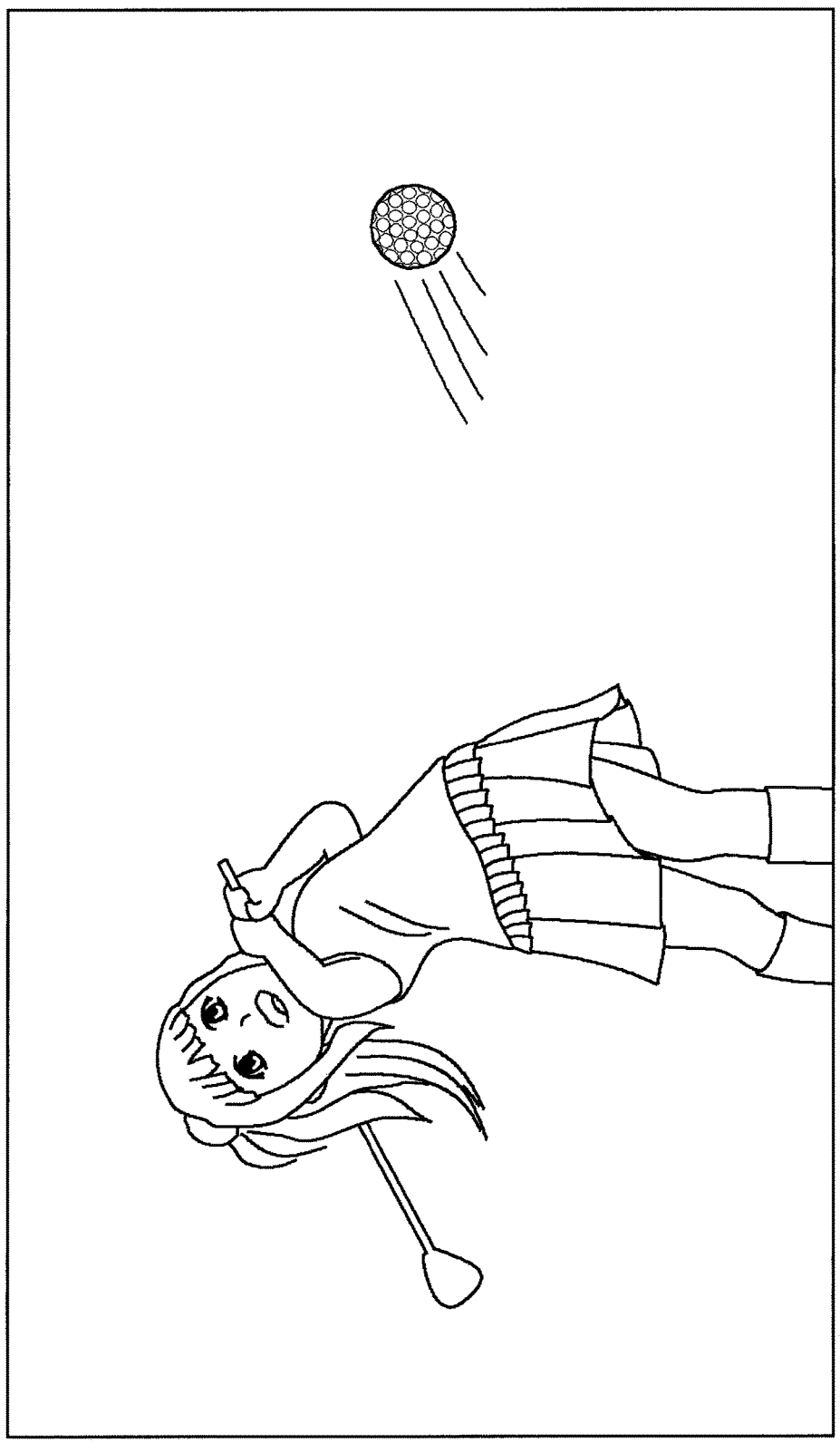

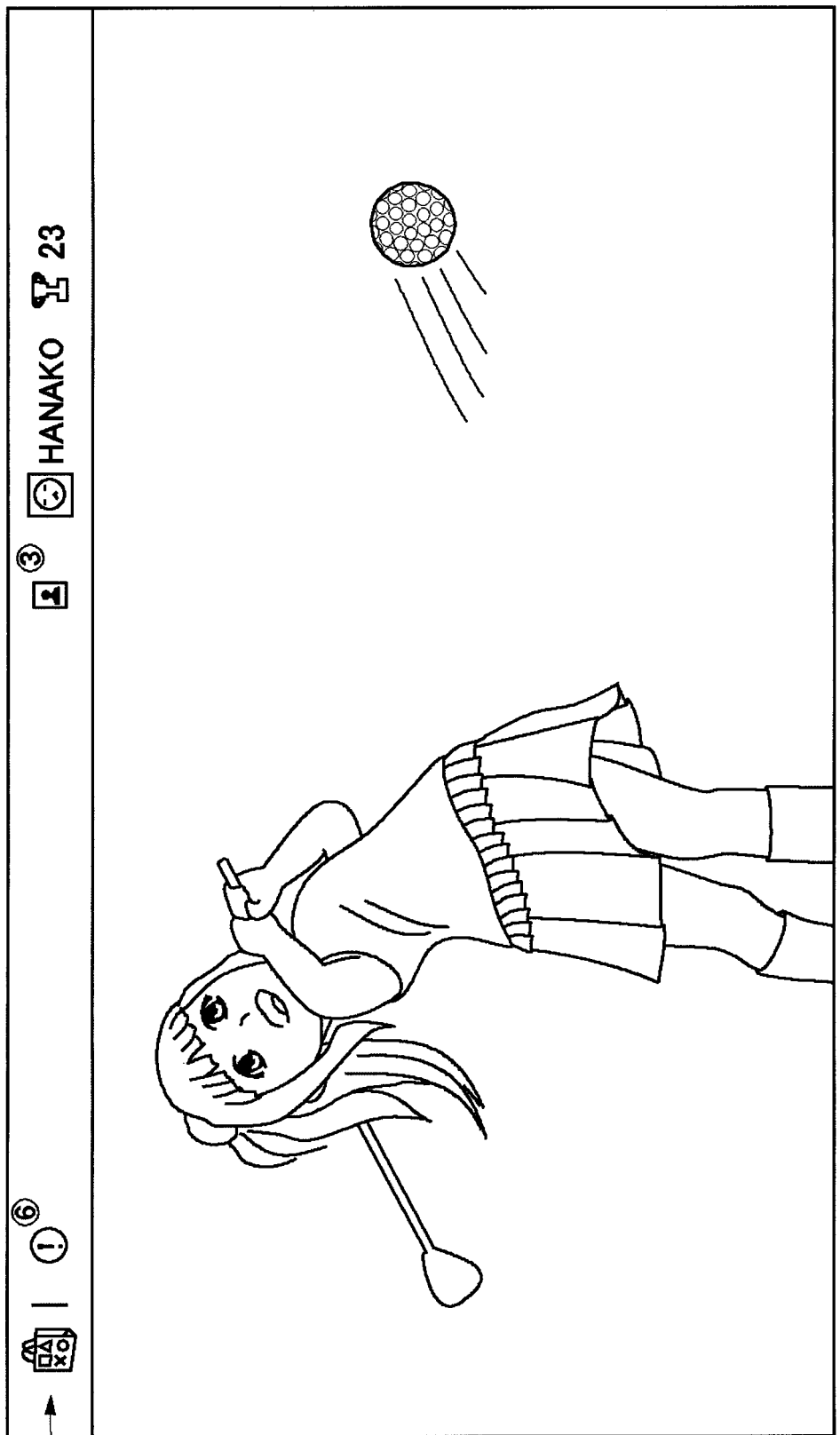

INFORMATION PROCESSOR AND IMAGE GENERATION METHOD

TECHNICAL FIELD

The present invention relates to an information processor having a power saving function.

Some information processors such as game devices have a power saving function adapted to automatically shut off the system power if the user does not make any operation for a given period of time or more. Mobile devices are battery-driven, causing them to face particularly strong power saving requirements. Stationary information devices are also expected to contribute to saving power for reduced useless power consumption.

CITATION LIST

Patent Literature

[PTL 1]
JP 2013-101433 A

SUMMARY

Technical Problem

The suspend function usually available with personal computers is designed to store, in memory, the status immediately before power-off and restore the system to the status before power-off when the power is turned on again. This allows the user to initiate his or her task from the status immediately before the suspend.

However, there is a circumstance in which restoration to the status immediately before the suspend is not typically best for some information processors. For example, assuming that the system suspends while an operation screen appears to shut off power, the user is most probably not happy if the operation screen appears to shut off power after the system resume. Therefore, the information processor should preferably generate a screen following the system resume to ensure that operations can be initiated without causing a sense of discomfort to the user after the system resume.

In an information processor into which a variety of users can log in, on the other hand, the circumstances are slightly different from personal computers that are basically intended for use by one specific user. For example, if we assume that after the system suspends with a user logged in the system, another user logs into the system. Then, the users are different before and after the suspend. Therefore, it is not preferable to return to the screen immediately before the suspend. It is necessary to ensure that the system returns to the screen immediately before the suspend only when the same user as that who was logged in before the suspend logs in after the suspend so as to solve the above problem.

Under such control, however, if the system suspends with a plurality of users simultaneously logged in the system, the system will not return to the screen immediately before the suspend unless all the users before the suspend log in, thus resulting in poor flexibility. For this reason, a technology for suitably generating a post-system-resume screen is seriously desired.

An object of the present invention is to provide a technology for suitably generating a post-system-resume screen.

Solution to Problem

In order to solve the above problem, an information processor according to a mode of the present invention includes a mode control section and a screen control section. The mode control section selects power saving mode as an operation mode. The screen control section generates a display screen. After the mode control section switches the mode from power saving mode to normal mode, the screen control section generates a display screen to match the type of screen that appeared before power saving mode was selected.

It should be noted that any combinations of the above components and any conversions of expressions of the present invention between "method," "device (processor)," "system," "recording media," "computer program," and so on are also effective as modes of the present invention.

BRIEF DESCRIPTION OF DRAWINGS

FIG. 4($a$) illustrates an example of a user selection screen, and FIG. 4($b$) illustrates an example of a passcode entry screen.

FIG. 7 is a diagram illustrating an example of a friend screen.

FIG. 8 is a diagram illustrating an example of a game screen.

FIG. 9 is a diagram illustrating an example of an application screen that appears after system resume.

DESCRIPTION OF EMBODIMENT

Figure 1:
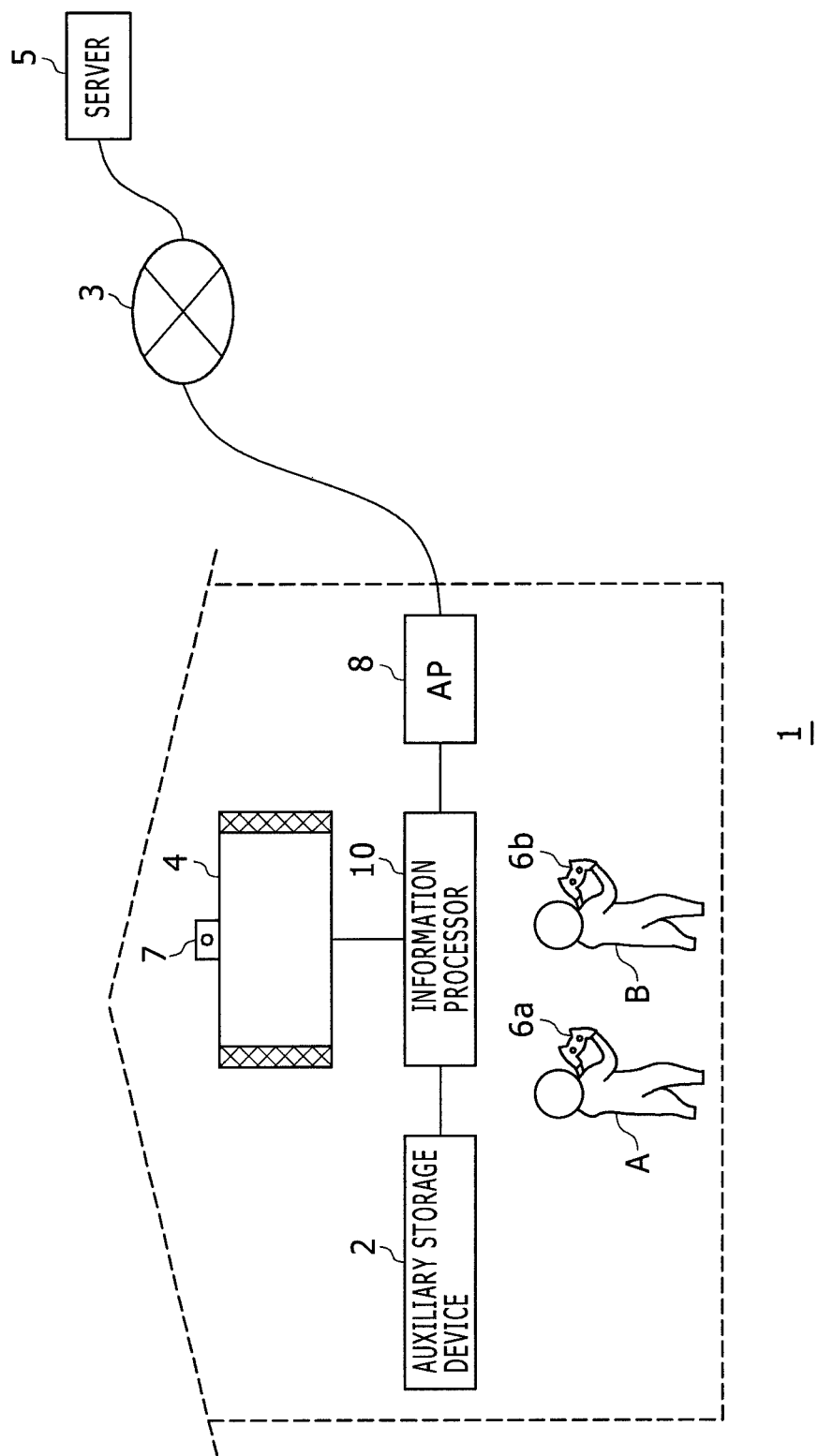
FIG. 1 is a diagram illustrating an information processing system according to an embodiment of the present invention.

FIG. 1 illustrates an information processing system 1 according to an embodiment of the present invention. The information processing system 1 includes an information processor 10, i.e., a user terminal, and a server 5. An access point (hereinafter referred to as an AP) 8 has a wireless access point function and a router function. The information processor 10 connects to the AP 8 in a wireless or wired manner for communication with the server 5 on a network 3.

An auxiliary storage device 2 is a large-capacity storage device such as HDD (hard disk drive) or flash memory. The auxiliary storage device 2 may be an external storage device adapted to connect to the information processor 10 through USB (universal serial bus). Alternatively, the auxiliary storage device 2 may be a built-in storage device. An output device 4 may be a television set having a display adapted to output video and a speaker adapted to produce audio. Alternatively, the output device 4 may be a computer display.

The information processor 10 connects to input devices 6 operated by users in a wireless or wired manner. Each of the input devices 6 outputs, to the information processor 10, operation information showing user operation results. When the information processor 10 receives operation information from the input devices 6, the information processor 10 reflects the information in the processing of the OS (operating system) (system software) and applications, causing the output device 4 to output processing results. Each of the input devices 6 includes a plurality of input sections such as a plurality of push-type operation buttons, an analog stick used to enter an analog quantity, and a rotating button. In the embodiment, the information processor 10 is a game device adapted to execute a game program or other applications, and the input device 6 may be a game controller adapted to supply user operation information to the game device.

A camera 7, an imaging device, is provided close to the output device 4 to capture an image of the surrounding space. Although FIG. 1 shows an example in which the camera 7 is attached to the top portion of the output device 4, the camera 7 may be arranged on a lateral side or the bottom portion of the output device 4. In any case, the camera 7 is arranged where it can capture an image of the user in front of the output device 4. The camera 7 may be a stereo camera.

The server 5 provides a network service to users of the information processing system 1. The server 5 manages network accounts adapted to identify users. Each user signs into the network service provided by the server 5 using a network account. As the user signs into the network service from the information processor 10, he or she can register saved game data and virtual trophies acquired while playing the game in the server 5. The user can also connect to other users via the network 3 to exchange chat or audio messages.

Figure 2:
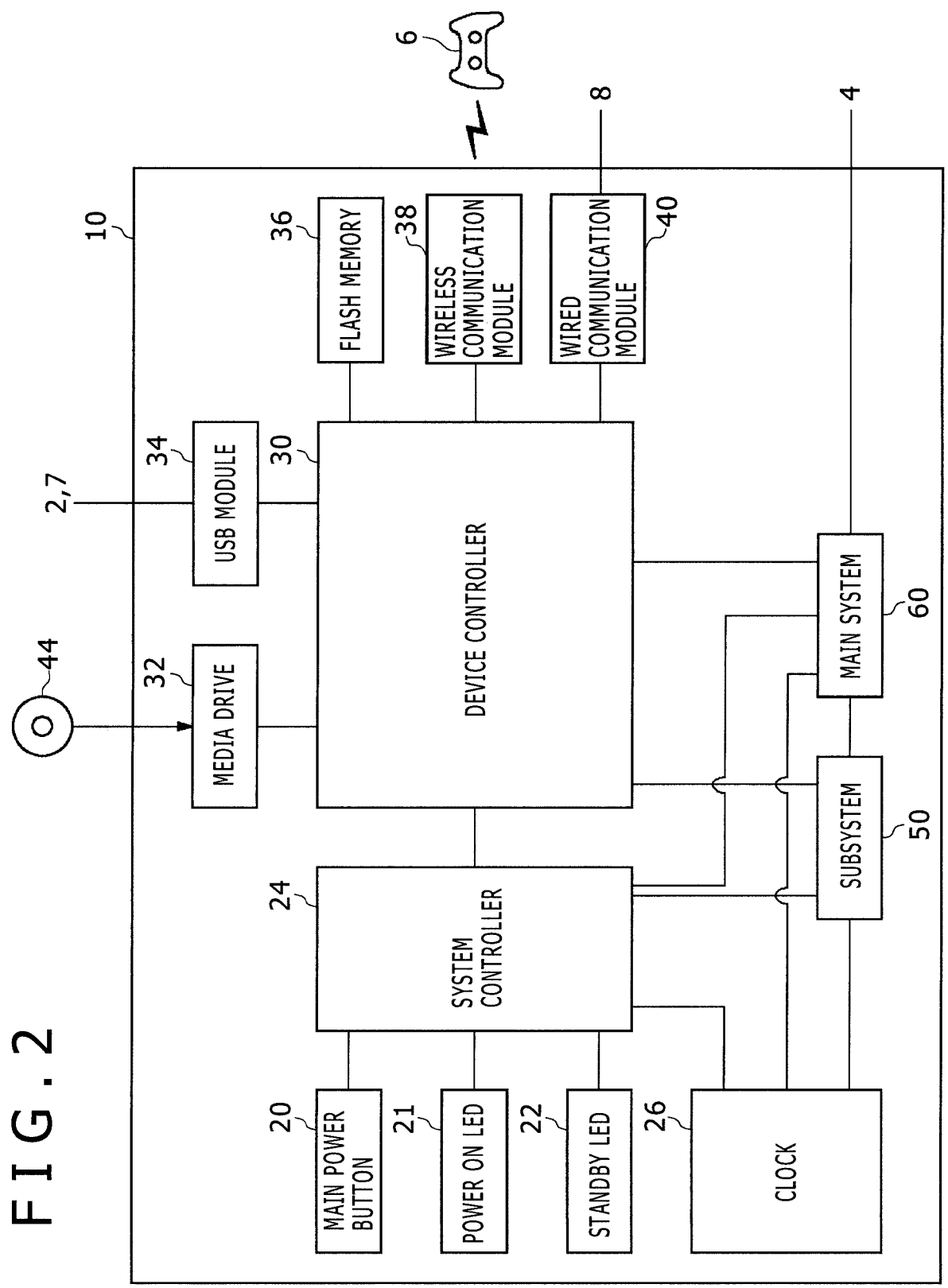
FIG. 2 is a diagram illustrating functional blocks of an information processor.

FIG. 2 illustrates functional blocks of the information processor 10. The information processor 10 includes a main power button 20, a power ON LED (light-emitting diode) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main CPU (central processing unit), a memory, i.e., a main storage device, a memory controller, a register, a GPU (graphics processing unit), and so on. The GPU is used primarily for arithmetic operations in game programs. The main CPU has a function to start the OS and execute applications stored in the auxiliary storage device 2 and a ROM (read-only memory) medium 44 in the environment provided by the OS.

The subsystem 50 includes a sub CPU, a memory, i.e., a main storage device, a memory controller, and a register, but not a GPU. The circuit gate count of the sub CPU is smaller than that of the main CPU, and the sub CPU consumes less power during operation than the main CPU. The sub CPU remains operational even when the main CPU is on standby, with the processing capability thereof being limited for minimal power consumption.

The main power button 20 is an input section for the user to make an operation input. The main power button 20 is provided on the front face of the enclosure of the information processor 10 and is operated to turn ON or OFF the power for the main system 60 of the information processor 10. Hereinafter, the expression "the main power is ON" refers to the fact that the main system 60 is in normal mode (active mode), and the expression "the main power is OFF" refers to the fact that the main system 60 is in standby mode (suspend mode). The power ON LED 21 lights up when the main power button 20 is switched ON. The standby LED 22 lights up when the main power button 20 is switched OFF.

The system controller 24 detects the pressing of the main power button 20 by the user. If the main power button 20 is pressed when the main power is OFF, the system controller 24 acquires the pressing as a "switch-ON instruction." On the other hand, if the main power button 20 is pressed when the main power is ON, the system controller 24 acquires the pressing as a "switch-OFF instruction." It should be noted that the main power can be also switched ON or OFF by operating a given button of the input device 6. When the system controller 24 acquires a "switch-ON instruction," the main system 60 performs a user login process.

The main CPU has a function to execute applications stored in the auxiliary storage device 2 and the ROM medium 44. On the other hand, the sub CPU does not have such a function. However, the sub CPU has a function to access the auxiliary storage device 2 and a function to exchange data with the server 5. In the information processor 10, the subsystem 50 remains operational even when the main system 60 suspends, thus allowing the user to remain signed into the network service provided by the server 5.

The clock 26 is a realtime clock adapted to create current date/time information and supplies this information to the system controller 24, the subsystem 50, and the main system 60. The device controller 30 is configured as an LSI (Large-Scale Integrated Circuit) adapted to transfer information between devices as does a southbridge. As illustrated in the figure, the system controller 24, the media drive 32, the USB module 34, the flash memory 36, the wireless communication module 38, the wired communication module 40, the subsystem 50, the main system 60, and other devices are connected to the device controller 30. The device controller 30 accommodates the differences in electrical characteristic and data transfer rate between the devices, thus controlling the data transfer timings.

The media drive 32 receives the ROM medium 44 that stores application software such as game and license information, driving the ROM medium 44 and reading the program and data therefrom. The ROM medium 44 is a read-only recording media such as optical disk, magneto-optical disk, or Blu-ray disc.

The USB module 34 is connected to external equipment by a USB cable. The USB module 34 is connected to the auxiliary storage device 2 and the camera 7 by a USB cable. The flash memory 36 is an auxiliary storage device that makes up an internal storage. The wireless communication module 38 communicates wirelessly, for example, with the input device 6 using a communication protocol such as Bluetooth (registered trademark) protocol or IEEE (Institute of Electrical and Electronic Engineers) 802.11 protocol. It should be noted that the wireless communication module 38 may support the third generation digital mobile phone system compliant with the IMT-2000 (International Mobile Telecommunication 2000) standard defined by the ITU (International Telecommunication Union). Further, the wireless communication module 38 may support a digital mobile phone system of other generation. The wired communication module 40 communicates with external equipment in a wired manner, connecting to the network 3 via the AP 8.

A plurality of kinds of login processes are available with the information processor 10. Upon login request from a user, the information processor 10 proceeds with a login process that matches the system settings. A description will be given below of the outline of two typical login processes of the information processor 10.

<Login Process 1>

Login process 1 is designed to allow a user to automatically log in if automatic login for a single user is specified. In login process 1, the user for whom automatic login is specified is logged in immediately after the information processor 10 has started up or resumes from the suspend state. If automatic login is specified, the user can automatically log in without going through a user selection screen in login process 2 which will be described later by switching ON the main power button 20 or operating a given button of the input device 6 with the main power of the information processor 10 switched OFF. This login process 1 is performed when there is no user who has already logged in and not if there is a user who has already logged in.

<Login Process 2>

Login process 2 is designed to allow a user selected in the user selection screen to log in. In login process 2, when the user transmits, to the information processor 10, a login request by operating a given button of the input device 6, the information processor 10 displays the user selection screen on the output device 4. As the user selects his or her own icon and enters a login passcode as necessary in the user selection screen by operating the input device 6, the information processor 10 authenticates the user and allows him or her to log in.

The information processor 10 has a power saving function and switches the operation mode from normal mode to power saving mode if a given condition is met. Then, when the user switches the operation mode from power saving mode back to normal mode by performing an operation to do so, the information processor 10 has a function to generate a display screen to match the first user who logs in after the operation mode has been switched back to normal mode and/or the type of screen that appears before power saving mode is selected.

Figure 3:
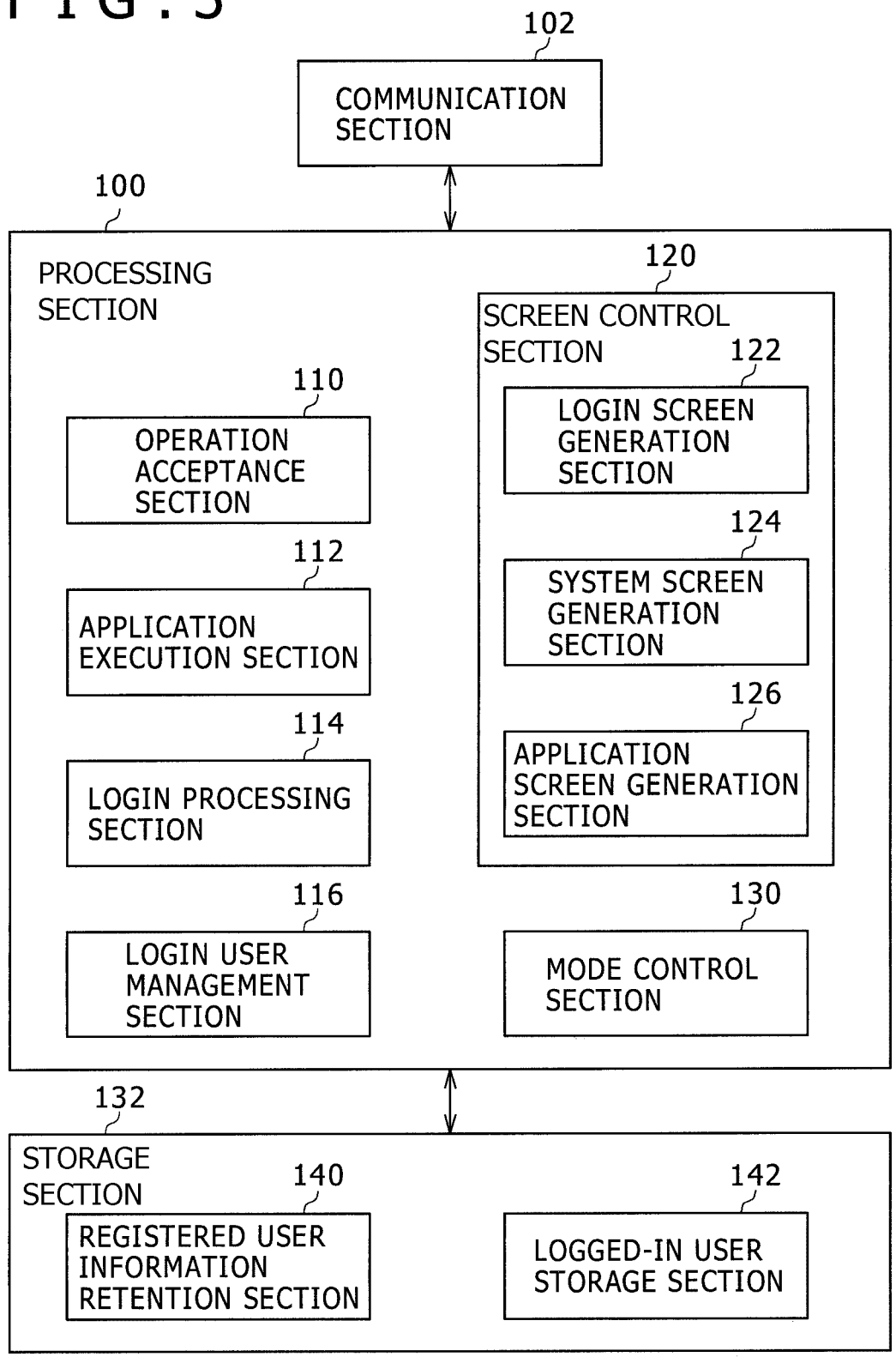
FIG. 3 is a diagram illustrating a configuration of the information processor.

FIG. 3 illustrates a configuration of the information processor 10. The information processor 10 includes a processing section 100, a communication section 102, and a storage section 132. The communication section 102 includes the wireless communication module 38 and the wired communication module 40 shown in FIG. 2. The storage section 132 includes the auxiliary storage device 2, the flash memory 36, or other memory such as RAM (random access memory) that is not shown. The functions of the processing section 100 are implemented by the OS (system software), the applications executed by the OS, and the memory. The processing section 100 includes an operation acceptance section 110, an application execution section 112, a login processing section 114, a login user management section 116, a screen control section 120, and a mode control section 130. The screen control section 120 has a function to generate a display screen and includes a login screen generation section 122, a system screen generation section 124, and an application screen generation section 126.

In FIG. 3, each of the components described as functional blocks adapted to perform a variety of processing tasks can be configured with circuit blocks, memories, and other LSIs in terms of hardware, and by a program loaded into the memory in terms of software. Therefore, it is understood by those skilled in the art that these functional blocks can be implemented in a variety of ways by hardware alone, software alone, or by a combination thereof and are not limited to any one of them.

The information processor 10 has a suspend/resume control function for the main system 60. The mode control section 130 switches the system operation mode between normal and power saving modes. Hereinafter, "power saving mode" may be referred to as standby or suspend mode.

It is necessary for a user to acquire a user account in advance and register his or her user information in the information processor 10 as a prerequisite so as to log into the OS. Hereinafter, a user who has registered his or her user account in the information processor 10 may be referred to as a "registered user." The information processor 10 allows simultaneous login of a plurality of registered users. Because a plurality of users are allowed to log in, the information processor 10 can individually store save data of each logged-in user.

A registered user information retention section 140 retains, for example, a login passcode, a sign-in ID (identification) for signing into the server 5, a network account, a user online ID, and a user icon for representing the user in association with each user account as registered user information. In the embodiment, registered user information of at least users A and B is registered in the registered user information retention section 140. Therefore, each of the users A and B can log in so that they can enjoy applications such as games together.

A description will be given below of the procedure for a user to log in.

As described above, login process 1 is performed when a registered user is specified as an automatic login user with no logged-in user. If the main power of the information processor 10 turns ON as a result of operation of a given button of the input device 6 when the main power is OFF (the information processor 10 is in standby mode), the operation acceptance section 110 accepts a login request, and the login processing section 114 allows the user for whom automatic login is specified to automatically log into the information processor 10. For example, if the user A is specified as an automatic login user, the login processing section 114 allows the user A to log in. The login processing section 114 stores login information, i.e., information identifying the user A (user account), in association with the device ID of the input device 6 in a logged-in user storage section 142.

If automatic login is not specified, or if there is a user who has already logged in although automatic login is specified, login process 2 is performed.

When the user operates a given button of the input device 6, the operation acceptance section 110 accepts a login request and informs the screen control section 120 of the login request. The login screen generation section 122 reads registered user information from the registered user information retention section 140 and generates a selection screen for selecting a registered user. More specifically, the login screen generation section 122 reads user icons and online IDs (or nicknames on the network) of the registered user information, displaying, on the output device 4, a user selection screen on which online IDs of the registered users are arranged in a list form.

FIG. 4(*a*) illustrates an example of a user selection screen. The user selection screen makes up a login screen for a user to log in. Hereinafter, user icons and online IDs will be referred to as "user-specific information." In the user selection screen, the login screen generation section 122 displays a focus frame 200 adapted to surround a piece of user-specific information in such a manner as to be able to move in the list. The user can select his or her own user-specific information by operating the input section of the input device 6, moving the focus frame 200 to the display area of his or her own user-specific information, and pressing the enter button of the input device 6.

We assume here that the user A who makes a login request is "HANAKO," and that when she selects "HANAKO" in the selection screen, the login processing section 114 displays, on the output device 4, a passcode entry screen shown in FIG. 4(*b*). When the user A enters a passcode here, the login processing section 114 determines whether the entered passcode is the same as a passcode for login of HANAKO retained by the registered user information retention section 140. When the two passcodes are the same, the user A (HANAKO) is logged in. The login processing section 114 stores login information, i.e., information identifying the user A (HANAKO) (user account), in association with the device ID of the input device 6 in the logged-in user storage section 142.

The user A logs into the information processor 10 through the above procedure. After the user logs in, the system screen generation section 124 generates a system screen and displays it on the output device 4. The system screen includes a home screen and function screens to which one moves from the home screen.

When the user A logs into the information processor 10, the system screen generation section 124 displays, on the output device 4, a home screen, a basic screen for operation, first.

Figure 5:
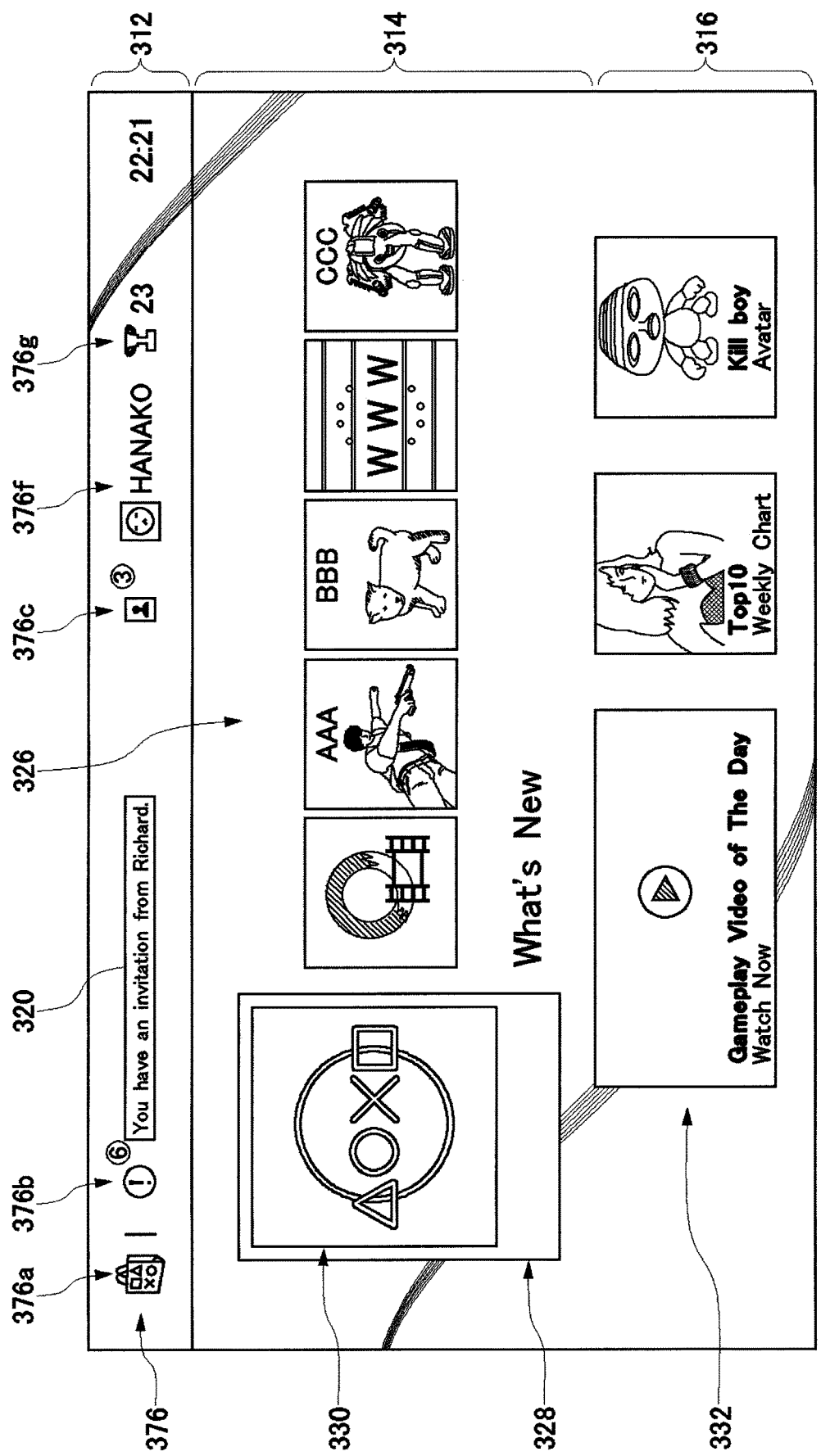
FIG. 5 is a diagram illustrating an example of a home screen.

FIG. 5 illustrates an example of a home screen. The system screen generation section 124 arranges a what's new icon 330 at the top (i.e., left end) of a row of icons. The system screen generation section 124 places the what's new icon 330 within a focus frame 328 in a content area 314, thus making the what's new icon 330 focused. The system screen generation section 124 arranges content icons 326 from the second place onwards in the row of icons in the order of most to least recent date and time of access from the current date and time on the basis of the date and time when each application or each piece of content was accessed by the user. Further, the system screen generation section 124 arranges a live information item 332 in a live area 316.

Still further, the system screen generation section 124 arranges some of a plurality of system function icons 376 in a system area 312. The system function icons 376 represent a plurality of system functions provided by the information processor 10. In the example shown in FIG. 5, a store icon 376*a*, a notice icon 376*b*, a friend icon 376*c*, a profile icon 376*f*, and a trophy icon 376*g* appear. The system screen generation section 124 arranges a trophy count indicator in association with the trophy icon 376*g*. The trophy count indicator represents the number of trophies gained by the user A ("23" in FIG. 5). Further, the system screen generation section 124 arranges an unread message count indicator in association with the notice icon 376*b*. The unread message count indicator represents the number of messages that have yet to be read by the user A ("6" in FIG. 5). The system screen generation section 124 forms a display area 320 for displaying messages addressed to the user A near the notice icon 376*b*.

The system screen generation section 124 arranges an online friend user count indicator in association with the friend icon 376*c*. The online friend user count indicator represents the number of online friend users, i.e., the current number of logged-in friends who are connected to the network 3 ("3" in FIG. 5). Friend users are those users who are registered as friends of the user A in the server 5.

When the user selects the friend icon 376*c* in the home screen shown in FIG. 5, the system screen generation section 124 generates a function screen about friends.

Figure 6:
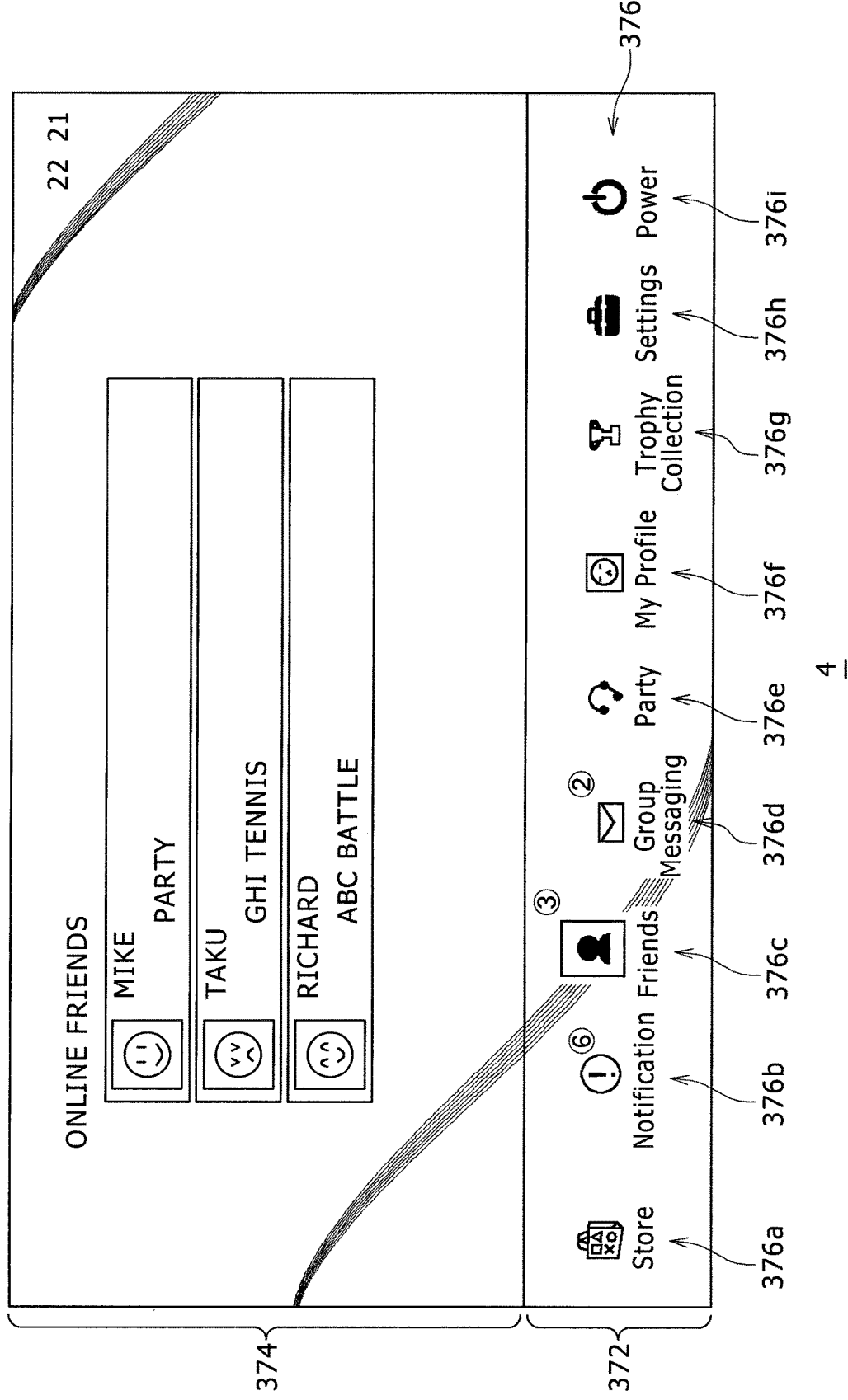
FIG. 6 is a diagram illustrating an example of a function screen to which one moves from the home screen.

FIG. 6 illustrates an example of a function screen to which one moves from the home screen. The system screen generation section 124 arranges the plurality of system function icons 376 side by side in a system function selection area 372. Here, the store icon 376*a*, the notice icon 376*b*, the friend icon 376*c*, a group message icon 376*d*, a party icon 376*e*, the profile icon 376*f*, the trophy icon 376*g*, a setting icon 376*h*, and a power icon 376*i* appear. The system screen generation section 124 sequentially switches from one system function icon 376 to focus to another in response to a horizontal operation input of the input device 6 by the user, displaying the focused icon in a highlighted manner (e.g., in a larger size or different color). FIG. 6 shows that the friend icon 376*c* is selected and focused and appears in a manner highlighted from other icons. Online friend presence information is displayed in a preview area 374.

When the user A confirms the selection of the focused friend icon 376*c* in this condition, the operation acceptance section 110 accepts the selection confirmation and supplies the confirmation to the system screen generation section 124. The system screen generation section 124 generates a screen about other users (hereinafter referred to as a friend screen), displaying the screen on the output device 4. FIG. 7 illustrates an example of a friend screen.

In the processing section 100, the application execution section 112 executes an application, and the application screen generation section 126 generates an application screen. Games are typical examples of applications. Applications also include web browsers and movie playing applications. In the embodiment, therefore, application screens include game screens generated by games, browser screens generated by web browsers, video screens generated by movie playing applications. Other screens generated by the system software are collectively referred to as system screens. The friend screen shown in FIG. 7 is one of these system screens.

Referring back to FIG. 5, when the user A arranges the content icon 326 of a desired game in the focus frame 328 in the home screen and operates the enter button of the input device 6, the operation acceptance section 110 accepts the application start operation, and the application execution section 112 executes the game program. When the operation acceptance section 110 accepts the application start operation, the login user management section 116 stores information identifying the started application (application ID) in association with the user account of the user A who started the application in the logged-in user storage section 142. This allows the logged-in user storage section 142 to store the user who started the application. It should be noted that the login user management section 116 may store, in other storage section, the user who started the application.

The application execution section 112 performs arithmetic operations to move game characters in a virtual space on the basis of operation information entered by the user A to the input device 6. The application screen generation section 126 includes a GPU adapted to handle rendering, receiving processing results of the game program and generating game image data to be displayed on the output device 4.

FIG. 8 illustrates an example of a game screen. The application execution section 112 allows the game to proceed using operation information of the input device 6 accepted by the operation acceptance section 110, and the application screen generation section 126 generates a game screen and displays it on the output device 4.

As described earlier, a plurality of registered users can log into the information processor 10. Therefore, while the user A plays a golf game by starting it after having logged in alone, the user B can log in and join the game. FIG. 1 shows that the user B joins the game so that the two users play the golf game together.

A description will be given below of system suspend and system resume.

The mode control section 130 sets the operation mode of the main system 60 to normal mode or power saving mode (standby mode). Transition to standby mode is triggered by one of the following operations:

(a1) When a given button of the input device 6 is operated, a power setting menu appears. Selecting "Standby Mode" causes the main system 60 to suspend.

(a2) When the power icon 376i is selected in the function screen shown in FIG. 6, the power setting menu appears. Selecting "Standby Mode" causes the main system 60 to suspend.

(a3) When the main power button 20 is pressed for a short period of time, the main system 60 suspends.

(a4) If transition to standby mode is selected when there is no operation input for a given period of time, the main system 60 suspends when the period of time without any operation reaches the given period of time.

When the operation acceptance section 110 accepts one of the operations (a1) to (a3) or detects that the no operation period of time has been reached to the given period of time, the mode control section 130 performs the suspend process, setting the operation mode to standby mode. Here, the term "suspend process" refers to a process adapted to save data of the application under execution immediately before the transition stored in the main memory or register of the main system 60 to other memory as suspend data. Other memory may be a RAM adapted to be powered even in standby mode or the flash memory 36, a non-volatile memory. After the mode control section 130 has saved the application data, the login processing section 114 causes all the logged-in users to log out. This allows the users A and B who are logged in to automatically log out before a transition to standby mode. After the login processing section 114 has caused the logged-in users to log out, the mode control section 130 turns OFF the power for the main system 60 and sets the operation mode to standby mode.

As described above, one of the features of the login processing section 114 is to cause all the logged-in users to log out before system suspend. The login processing section 114 can maintain the users logged in during system suspend. In this case, however, it is necessary for all the users who were logged in before the suspend to log in again in order to return to the status before the suspend following the system resume. However, the information processor 10 according to the embodiment is a game device. It is not highly likely that all the users who were logged in before the suspend may log in again at the same time. If an attempt is made to maintain the users logged in during the suspend, it is probably difficult to return to the original status. For this reason, the login processing section 114 causes all the users who are logged in before the system suspend to log out and allows any user to log in after the resume.

It should be noted that the login processing section 114 deletes login information of the users A and B from the logged-in user storage section 142 by causing all the users to log out. At this time, login information includes information indicating that the application (golf game) has been started by the user A. However, this information is left undeleted. Information indicating the start of the application by the user A may remain stored in the logged-in user storage section 142 or saved to other memory by the suspend process. In any case, information indicating the start of the application that was executed before the suspend by the user A remains stored in the storage section 132 during the suspend so that the login processing section 114 can refer to this information after the resume.

Further, another feature of the login processing section 114 is to cause the users to log out after the completion of the suspend process by the mode control section 130. When the users are logged out before the suspend process, there are no players to play the game. As a result, the game ends at that time. For this reason, the playing statuses of the users A and B are stored by the suspend process first, and then the login processing section 114 causes the logged-in users to forcefully log out. Then, the mode control section 130 causes the main system 60 to switch to standby mode.

Transition from standby mode to normal mode is triggered by one of the following operations:

(b1) When a given button of the input device 6 is operated, the power for the main system 60 is turned ON, causing the main system 60 to resume.

(b2) When the main power button 20 is pressed for a short period of time, the power for the main system 60 is turned ON, causing the main system 60 to resume.

(b3) When a start request is received from an information device other than the information processor 10, the power for the main system 60 is turned ON, causing the main system 60 to resume. This operation is performed to start remote play. It should be noted that, in remote play, a user who has registered his or her user account in the information processor 10 transmits game operation information to the information processor 10 from a remote location using an information device and receives game images in which the operation information has been reflected on game proceeding from the information processor 10 so as to play a game.

When the operation acceptance section 110 accepts one of the operations (b1) to (b3), the mode control section 130 performs the resume process to switch the operation mode to normal mode, and the login processing section 114 performs the login process. As described above, if automatic login is specified, the login processing section 114 allows the user to log in. If not, the login screen generation section 122 displays a user selection screen (refer to FIG. 4) on the output device 4, and the login processing section 114 allows the user to log in.

When the user logs in after the mode control section 130 has switched the mode from standby mode to normal mode, the screen control section 120 generates a display screen to match the user who has logged in. More specifically, the screen control section 120 generates a display screen in accordance with whether the user who has logged in is the user who started the application or not before transition to standby mode.

<If the User Who Started the Application Before the Suspend Logs in>

Before the suspend, the user A started a golf game, and the users A and B were playing the game together. The screen control section 120 displays the game screen that appeared before the suspend if the first user who logged in after the system resume is the user A.

The login processing section 114 refers to the user account of the user who logged in and that of the user who started the application before the suspend that is stored in the storage section 132, thus determining whether the two accounts match. When the two accounts match, the login processing section 114 detects that the user who started the application before the suspend has logged in again, notifying the screen control section 120. As a result, the application screen generation section 126 displays, on the output device 4, the application screen that appeared before the suspend using the application data that was saved by the suspend process. This allows the user A to resume the game quickly.

FIG. 9 illustrates an example of an application screen that appears after system resume. An information bar 380 appears in this application screen temporarily such as approximately ten seconds. The information bar 380 shows the same content as that in the system area 312 of the home screen (refer to FIG. 5). That is, part of the system screen appears in the application screen to which the system returns after resume. As described above, the screen control section 120 displays not only an application screen but also part of the system screen (home screen in this case), thus notifying the user A of latest information. It should be noted that it is difficult for the user A to manipulate the information bar 380, and that it is necessary to return to the home screen if he or she wishes to view latest information.

The game returns to the status in which the users A and B play. At the time of the return, however, the user B has already logged out. Therefore, the game treats the user B as a player removed from the game. In order for the user B to play the golf game again, it is only necessary for him or her to log in again and join the game.

<If a User Other than the User Who Started the Application Before the Suspend Logs in>

If the first user who logs in after the system resume is the user B or other registered user, the login processing section 114 detects that a user other than the user who started the application before the suspend has logged in. The login processing section 114 notifies the screen control section 120 to this effect. As a result, the system screen generation section 124 displays a given screen on the output device 4. Here, the system screen generation section 124 displays the home screen shown in FIG. 5 on the output device 4 as a given screen. The home screen is a basic screen to start an application or open a function screen. A logged-in user can perform a variety of operations from the home screen. That is, the home screen can be said to be the most convenient for users. As the system screen generation section 124 presents the home screen to a logged-in user, the logged-in user can quickly start a game or view the friend screen. It should be noted that if the logged-in user attempts to start a game, the game that was started by the user A before the suspend is paused. Therefore, the application execution section 112 may notify the logged-in user that the game that was started by the user A will be terminated when the logged-in user starts a game.

As described above, when the user A who started an application before transition to standby mode logs in again, the application screen that appeared immediately before the transition is presented to the user A. When a registered user other than the user A logs in, the home screen is presented. The user A started and played a game on his or her own before the transition to standby mode. Therefore, it is highly likely that he or she will play the same game after a re-login. On the other hand, the user B only participated in the game started by the user A. Therefore, it is possible that he or she may start other game or application after a re-login. For this reason, the screen control section 120 exercises control so that a different display screen appears after a re-login depending on whether the user who has logged in is the user who started the application or not even if he or she was logged in previously.

The above process is performed when the application screen appeared on the output device 4 immediately before the suspend. If the mode is switched to standby mode when the application screen appears, the screen control section 120 generates a display screen to match the user who logs in after the resume, thus providing a sense of operation tailored to users' needs.

On the other hand, if the system screen appears immediately before the suspend rather than the application screen, it is not typically best to return to the pre-suspend system screen after the resume. For example, if the friend screen shown in FIG. 7 appeared immediately before the suspend, the user A may be interested in online friends at that time.

However, it is highly likely that the user A may be no longer interested when he or she logs in after a while.

For this reason, when a user logs in after the mode control section 130 has switched the mode from standby mode back to normal mode, the screen control section 120 generates a display screen to match the type of screen that appeared before standby mode was selected. In the embodiment, the system and application screens are available as screen types.

More specifically, if the system screen appears immediately before power saving mode is selected, the system screen generation section 124 displays the given system screen (home screen) on the output device 4 after the mode has been switched from power saving mode back to normal mode. The home screen is convenient, allowing users to perform a variety of operations. Further, the home screen typically appears after resume, thus providing users with a homogeneous sense of operation.

On the other hand, if the application screen appears before power saving mode is selected, the application screen generation section 126 displays, on the output device 4, the application screen that appeared before the suspend using the application data that was saved by the suspend process as described above. This allows the user to resume the game quickly. It should be noted that part of the home screen should preferably be displayed together with the application screen to notify the user of availability of latest information as illustrated in FIG. 9.

Thus, an embodiment of the present invention has been described above. It should be understood by those skilled in the art that the above embodiment is illustrative, that the combination of components and processes can be modified in various ways, and that such modification examples also fall within the scope of the present invention.

REFERENCE SIGNS LIST

1 . . . Information processing system, 10 . . . Information processor, 60 . . . Main system, 100 . . . Processing section, 102 . . . Communication section, 110 . . . Operation acceptance section, 112 . . . Application execution section, 114 . . . Login processing section, 116 . . . Login user management section, 120 . . . Screen control section, 122 . . . Login screen generation section, 124 . . . System screen generation section, 126 . . . Application screen generation section, 130 . . . Mode control section, 132 . . . Storage section, 140 . . . Registered user information retention section, 142 . . . Logged-in user storage section.

INDUSTRIAL APPLICABILITY

The present invention is applicable to technical fields related to power saving functions.

The invention claimed is:

1. An information processor comprising:
a mode control section adapted to: (i) engage a power saving mode from a normal mode, and (ii) engage the normal mode from the power saving mode; and
a screen control section adapted to generate among a plurality of different types of display screens in the normal mode, including a plurality of different system screens and a plurality of different application screens,
wherein after the mode control section switches the mode from the power saving mode to the normal mode, the screen control section generates the display screen to match the type of display screen that appeared before the power saving mode was engaged, wherein when the type of display screen that appeared before the power saving mode was engaged was a first system screen (a home screen), then the display screen to match may also be the first system screen (the home screen), and wherein when the type of display screen that appeared before the power saving mode was engaged was a second system screen (not a home screen), then the display screen to match may not be the second system screen.

2. The information processor of claim 1, wherein if an application screen appeared before the power saving mode was selected, the screen control section generates the application screen after switching the mode from the power saving mode to the normal mode.

3. The information processor of claim 2, wherein the screen control section displays part of one of the plurality of different system screens together with the application screen.

4. The information processor of claim 2, wherein the application screen is a game screen.

5. The information processor of claim 1, wherein if one of the plurality of different system screens appeared before the power saving mode was entered, the screen control section generates the one of the plurality of different system screens after switching the mode from the power saving mode to the normal mode.

6. The information processor of claim 5, wherein the one of the plurality of different system screens is the home screen.

7. A screen generation method comprising:
alternately engaging: (i) a power saving mode from a normal mode, and (ii) the normal mode from the power saving mode; and
generating among a plurality of different types of display screens in the normal mode, including a plurality of different system screens and a plurality of different application screens,
wherein after switching the mode from the power saving mode to the normal mode, generating the display screen to match the type of display screen that appeared before the power saving mode was engaged,
wherein when the type of display screen that appeared before the power saving mode was engaged was a first system screen (a home screen), then the display screen to match may also be the first system screen (the home screen), and
wherein when the type of display screen that appeared before the power saving mode was engaged was a second system screen (not a home screen), then the display screen to match may not be the second system screen.

8. A non-transitory, computer readable storage medium containing a program for a computer, which when executed by the computer, causes the computer to carry out actions, comprising:
alternately engaging: (i) a power saving mode from a normal mode, and (ii) the normal mode from the power saving mode; and
generating among a plurality of different types of display screens in the normal mode, including a plurality of different system screens and a plurality of different application screens,
wherein after switching the mode from the power saving mode to the normal mode, generating the display screen to match the type of display screen that appeared before the power saving mode was engaged,
wherein when the type of display screen that appeared before the power saving mode was engaged was a first system screen (a home screen), then the display screen to match may also be the first system screen (the home screen), and
wherein when the type of display screen that appeared before the power saving mode was engaged was a second system screen (not a home screen), then the display screen to match may not be the second system screen.

* * * * *